United States Patent [19]
Habegger et al.

[11] 3,862,493
[45] Jan. 28, 1975

[54] APPARATUS AND METHOD FOR TYING COILS

[75] Inventors: Richard J. Habegger, Grabill; Stanley L. Wargel, Fort Wayne, both of Ind.

[73] Assignee: General Electric Company, Fort Wayne, Ind.

[22] Filed: Aug. 7, 1973

[21] Appl. No.: 386,372

[52] U.S. Cl............. 112/121.2, 29/205 R, 29/596, 66/1 R
[51] Int. Cl............................................ D05b 3/00
[58] Field of Search...... 29/596, 606, 205 R, 205 D; 112/2, 121.2; 66/1 R; 100/2, 13, 14, 15; 310/260, 270

[56] References Cited
UNITED STATES PATENTS

| | | | |
|---|---|---|---|
| 2,580,871 | 1/1952 | Wirtz | 66/1 R |
| 2,883,949 | 4/1959 | Ammann | 112/121.2 |
| 3,050,019 | 8/1962 | Muskulus | 112/121.2 |
| 3,659,337 | 5/1972 | Gawthrop et al. | 29/606 |
| 3,685,470 | 8/1972 | Frederick | 112/121.2 |

*Primary Examiner*—Carl E. Hall
*Attorney, Agent, or Firm*—John M. Stoudt; Ralph E. Krisher, Jr.

[57] ABSTRACT

Apparatus and method for lacing or tying cord about end turn portions of coils that project beyond side surfaces, e.g., ends or "faces," of a dynamoelectric machine magnetic core. Apparatus and method, in preferred form, are such that: as the end of tying or stitching cycle is approached, and after last stitch is commenced; cord pulling member and core are relatively moved so that cord pulling member is located to receive a final cord segment (e.g., a cord segment associated with the last stitch in such cycle). As the last stitch is completed, portion of final cord segment is moved into position relative to the cord pulling member so that, upon retraction of cord pulling member, final cord segment is pulled taut and either concurrently or subsequently severed. More desirable for at least leading or advancing end of cord pulling member to be of blunt configuration.

11 Claims, 10 Drawing Figures

APPARATUS AND METHOD FOR TYING COILS

CROSS REFERENCE TO RELATED APPLICATIONS

This application is related to: application Ser. No. 333,495, filed in the names of Harold T. Fields and Richard J. Habegger on Feb. 20, 1973 and which issued as Pat. No. 3,813,754 on June 4, 1974; application Ser. No. 336,727, filed in the name of Richard J. Habegger on Feb. 28, 1973; and application Ser. No. 386,371 filed of even date herewith in the names of Richard J. Habegger and Frank R. Dombrowski and titled APPARATUS AND METHODS FOR USE IN COIL TYING, and which issued as Pat. No. 3,824,940 on July 23, 1974. All of these just referenced applications are assigned to the assignee of the present application.

BACKGROUND OF THE INVENTION

This invention relates generally to apparatus and methods for tying or lacing coils in electromagnetic devices, and more particularly to apparatus and methods for relatively positioning and controlling tying components and segments of tying material when completing an operational cycle or subcycle involving the binding, with appropriate cord or the like, of coil end turns projecting beyond the side faces of a dynamoelectric machine core.

Apparatus and methods for tying coils are described, for example, in Gawthrop, et al. Pat. No. 3,659,337 which issued May 2, 1972 and which is assigned to the assignee of the present application. In this Gawthrop, et al., patent, the entire disclosure of which is specifically incorporated herein by reference, and in other publications in the art; tying methods and apparatus are disclosed that utilize a pair of relatively movable tying members.

With one prior arrangement and approach of which we are aware, after the last stitch of a tying cycle or subcycle has been made, the tying material or cord has been manually severed. It is of course, desirable to sever the cord automatically so as to save production time, and in efforts to do this, barbed cord pullers having relatively pointed ends have been used to automatically grasp a cord segment, pull a length of cord to a desired location, and then sever the cord. Now expired Wirtz Pat. No. 2,580,871 illustrates one such approach, and the above referenced Gawthrop et al. patent teaches yet another approach.

With prior approaches, relatively precise adjustments and apparatus set-ups are required so that a pointed cord puller will move along a path such that the point of the puller will pass in very close proximity to a "final" cord segment extending from the last completed stitch. In these arrangements, the location of the final cord segment also must be precisely controlled since, as will be understood, the relative location of the final cord segment and cord puller must be such that a barb or other cord retaining part of the puller will deflect the final cord segment during an "advance" stroke and then engage and retract such segment on a "return" stroke.

The just described approach requires that a tying cycle be completed at least to the point where the final segment is precisely and finally located before the cord puller is actuated. Thus, the time required for movement of the cord puller, and severance of the cord is in addition to the actual time required for a tying operation.

It would be desirable to provide tying apparatus and methods whereby a cord puller may advance during a stitching or tying step and thus reduce the total time that otherwise would be required for completion of a tying cycle. It also would be desirable to provide blunted instrumentalities for pulling final segments of cord; and to reduce, if not eliminate, precision adjustments, set-ups, and operational relationships.

SUMMARY OF THE INVENTION

Accordingly, it is a general object of the present invention to provide new and improved apparatus and methods for tying coils.

It is another object of the present invention to provide new and improved coil tying apparatus wherein the need for precision adjustments and set-ups is at least reduced.

It is yet another and more specific object of the present invention to provide a method for tying coils wherein a final cord segment that ultimately is severed is moved to a desired position relative to cord pulling means after such means has been positioned adjacent to a coil being laced.

It is a still more specific object of the present invention to provide an improved method that includes initiating a cord pulling and severing operation while the last stitch is being completed on a dynamoelectric machine.

It is a still further object of the present invention to provide new and improved coil tying apparatus wherein actuable mechanisms are provided with improved configurations.

In carrying the above and other objects in one form, we provide improved apparatus and methods for lacing or tying cord about end turn portions of coils that project beyond side surfaces, e.g. ends or "faces," of a dynamoelectric machine magnetic core. In an illustrated embodiment, a stator core having coils therein is supported while the core and tying units are periodically relatively indexed. As the end of a tying or stitching cycle is approached, and after the last stitch in such cycle is commenced, a cord pulling member and the core are moved relative to each other so that the cord pulling member is located to receive a final cord segment (e.g., a cord segment associated with the last stitch in such cycle). As the last stitch is completed, a portion of the final cord segment is moved into position relative to the cord pulling member so that, upon retraction of the cord pulling member, the final cord segment is pulled taut and either concurrently or subsequently is severed. In a preferred form, at least the leading or advancing end of the cord pulling member is of a blunt configuration so that hazards associated with movement of pointed or sharp movable members are avoided.

We have illustrated herein apparatus wherein coil portions at two ends of a stator core are tied or laced concurrently and wherein the core periodically indexes relative to tying units. It will be understood, however, that the invention may be embodied in, and methods practicing the invention may be carried out while using, apparatus wherein coil portions at only one end of a core are laced or while using apparatus wherein tying units periodically index relative to a stationary core — whether coil portions at one or both ends of the stationary core are being laced.

The subject matter which we regard as our invention is particularly pointed out and distinctly claimed in the concluding portion of the specification. Our invention itself, however, both as to its organization, method of operation, and preferred sequence of steps together with further objects and advantages thereof, may best be understood by reference to the following description taken in conjunction with the accompanying drawings wherein:

Figure 1:
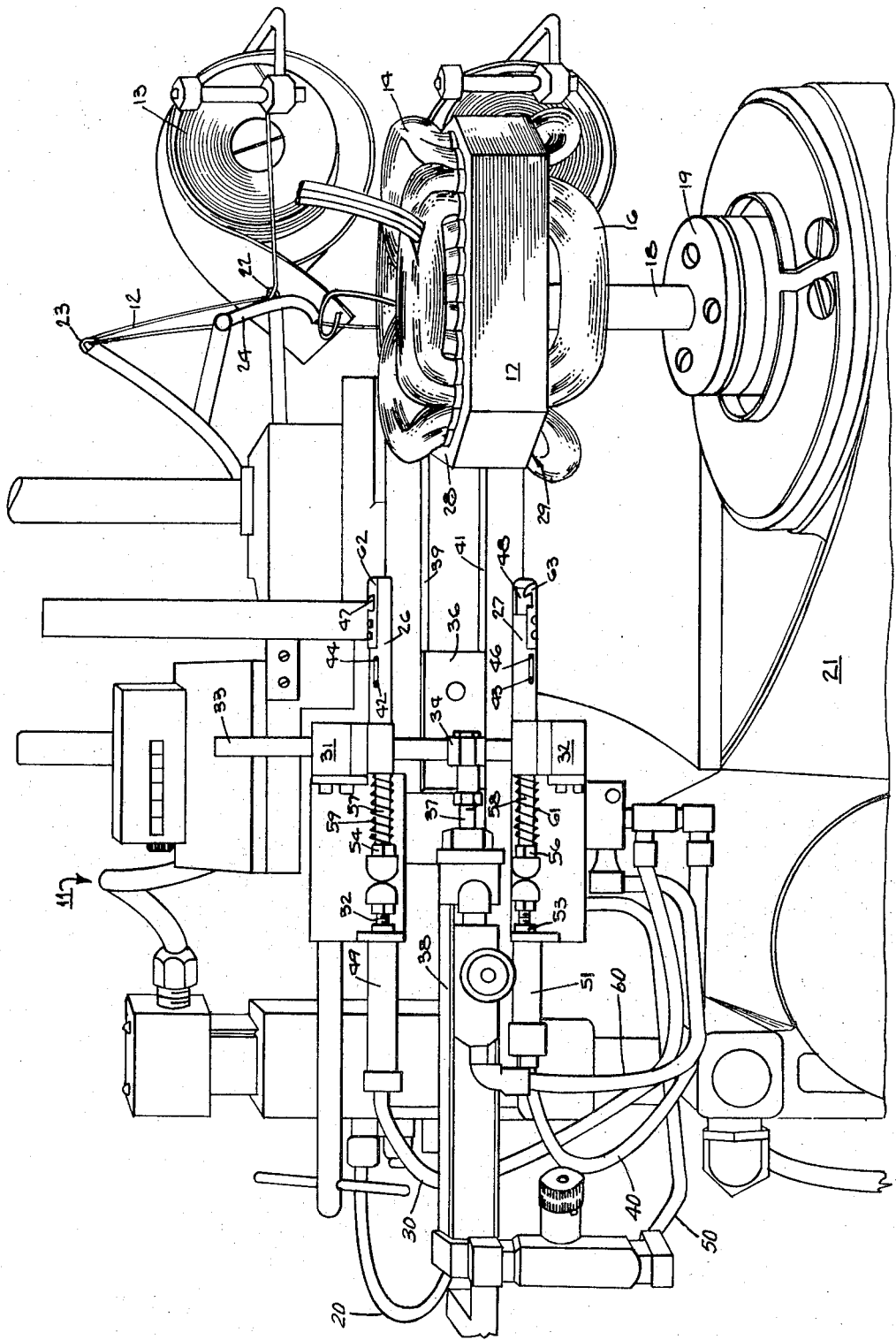
FIG. 1 is a view in perspective of apparatus for tying coils, with parts removed and parts broken away, embodying the present invention in one form, and with which our novel method may be practiced in one form.
Figure 2:
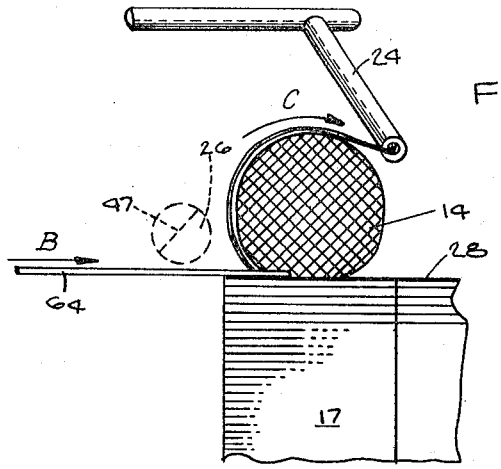
FIGS. 2–6 are schematic representations of parts of the apparatus of FIG. 1, with FIGS. 2–4 representing the relative relationships of various parts during practice of the invention, FIG. 5 representing the relationship of such parts prior to pulling a final cord segment, and FIG. 6 representing a relationship that would occur if prior teachings were followed.
Figure 3:
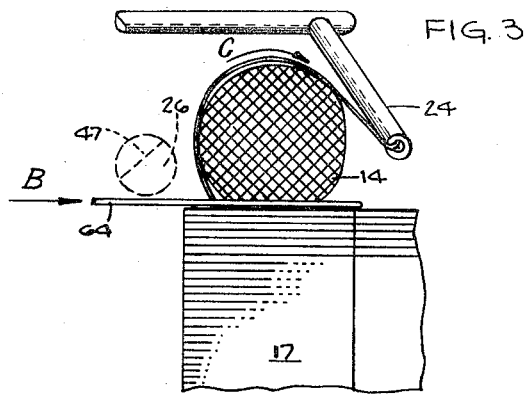
Figure 4:
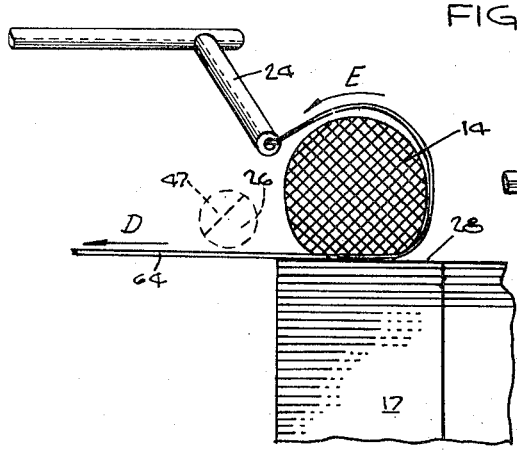
Figure 5:
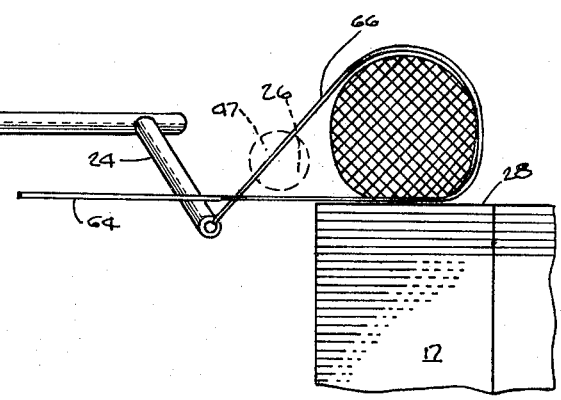
Figure 7:
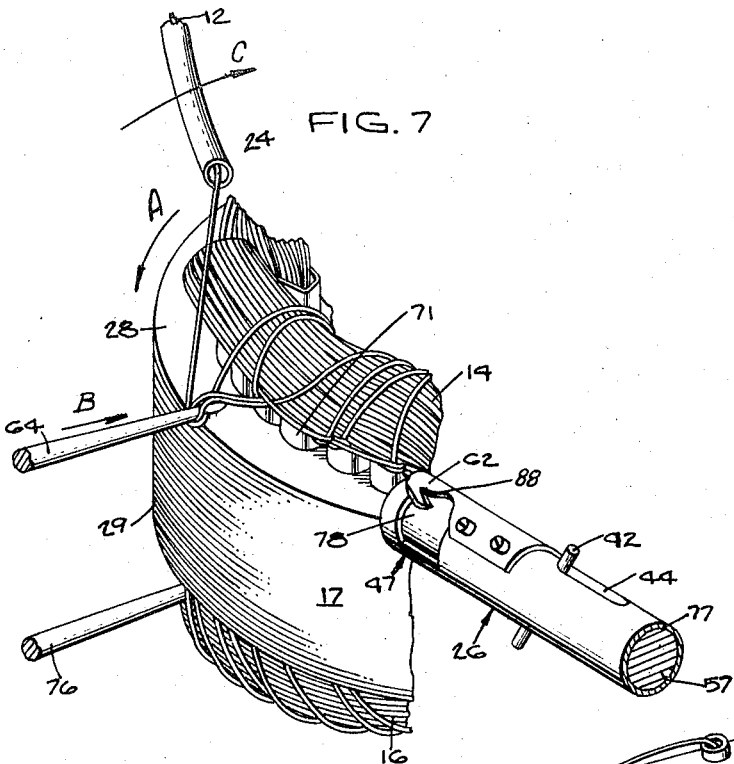
Figure 10:
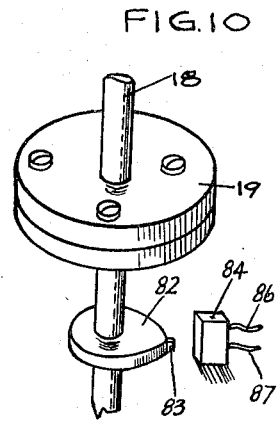
Figure 9:
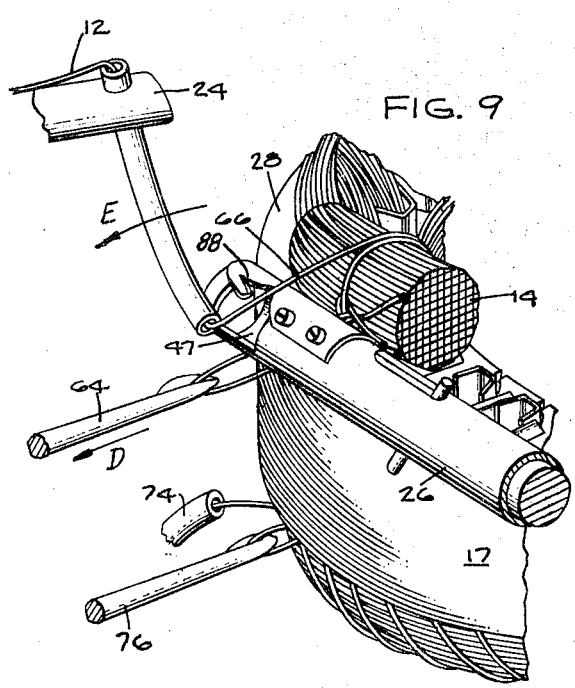
Figure 8:
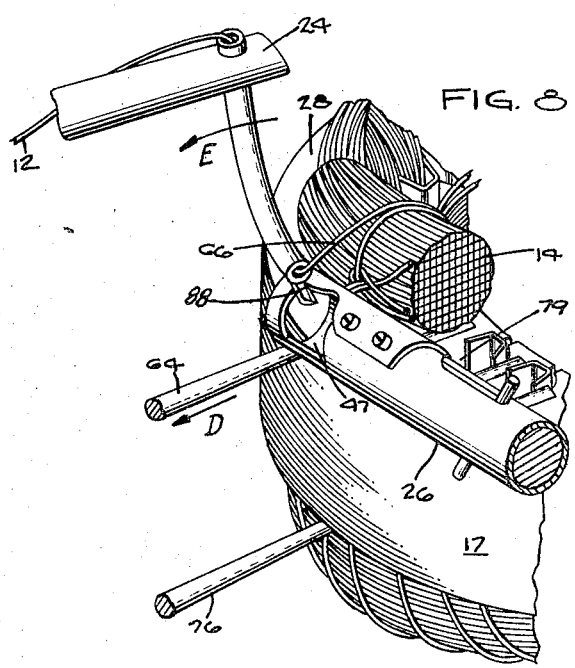

FIGS. 7–9 are perspective views, of portions of the structure shown in FIG. 1, representing preferred sequences of steps and operational relationships with FIG. 7 illustrating the preferred relationship of such structure just prior to the point in time associated with FIG. 2 with FIG. 8 representing the relationship of such structure just after or approximately corresponding to the point in time associated with FIG. 4 with FIG. 9 representing the relationship of such parts just prior to the point in time associated with FIG. 5; and FIG. 10 is a schematic perspective view, with parts removed and broken away, illustrating one approach that may be followed to initiate operation of a cord segment pulling member.

DESCRIPTION OF THE PREFERRED EMBODIMENTS

Turning now to the drawings in more detail, we have illustrated improved apparatus generally denoted by the reference numeral 11, embodying the invention in one form thereof, and capable of practicing one form of the inventive method. The apparatus 11 is shown as being set up for tying or binding cord 12, supplied from a reel or spool 13, about coil end turn portions 14 of windings accommodated on a magnetic stator core 17. A second supply of cord, for tying end turn portions 16, is hidden from view by stator 17 in FIG. 1. Cores of the type shown at 17 are described in more detail in numerous patents, including the above referenced Gawthrop, et al., patent. Accordingly, further description of such cores is not presented herein.

The apparatus 11 includes an article or core holder assembly of the type shown and described in detail in the Gawthrop et al patent. The core holder assembly is carried by the shaft 18 which in turn is movable in bearing or support block 19 and the machine frame 21. The shaft 18, and thus the core support and core, are periodically indexed relative to the frame 21 by drive mechanisms as disclosed in the above referenced Gawthrop et al patent. The drive mechanisms may, when desired, incorporate features of and embody the novel aspects of the above referenced applications Ser. Nos. 333,495 and 336,727 (Pat. No. 3,813,754), the entire disclosures of which are incorporated herein by reference.

Since many parts of the apparatus 11 correspond to parts of the apparatus described in the just mentioned applications or the Gawthrop et al patent, primary discussion herein is directed to those portions of the apparatus 11 that differ from such prior apparatus.

While lacing or tying cord about the end turn portions of the windings on core 17, cord 12 is fed through tensioning eyelets 22, 23 to a string tube 24. The string tube, in conjunction with a lacing hook, stitches or ties cord about the end turn portions 14 end turn portions 14. In the apparatus 11, a lacing tube and string tube are also provided (along with tensioning eyelets) to wrap or lace cord from the hidden from view cord supply about the end turn portions 16 of the windings on the stator 17. As the lacing hook and string tubes cyclically move to disposed cord about the end turns, the stator core 17 is periodically indexed. This indexing movement may be in the fashion taught by the Gawthrop, et al., patent or as taught in the above referenced Fields and Habegger application. In addition, the lacing hooks the string tubes may develop a stitch following each index of the stator core 17, or one or more stitches may be selectively skipped at either end of the stator as taught in the above referenced Habegger application No. 336,727.

The upper set of tying members, (i.e., the upper string tube 24 and upper lacing hook) may be movable vertically relative to the upper face of core 17 so as to accommodate various stack heights or variations in the height of a given stator core, and apparatus 11 does include this feature. Such adjustment may be effected manually or automatically, and a manual approach was used for apparatus 11.

Upon completion of a lacing or tying cycle (or subcycle) the lacing operation terminates, and a pair of cord pullers 26, 27 are carried forward to lie in a desired predetermined position relative to the faces 28, 29 of core 17 while the last or final stitch is being developed or completed. As the development of such last stitch is completed, the cord tubes lay a final segment of core along a cord receiving region of the cord pullers. Thereafter, the cord pullers 26, 27 return to the position thereof shown in FIG. 1, pull a segment of string or cord from each cord tube, and sever the cord so that the laced core is freely removable from the apparatus 1. The actuating and string release mechanism associated with the cord pullers may be as shown and described in the Gawthrop et al patent. Alternatively, such mechanisms and the procedures associated with the use thereof may be as shown and as taught and claimed in the above identified commonly assigned Habegger and Dombrowski application Ser. No. 386,371 (Pat. No. 3,824,940). Since the arrangement shown in FIG. 1 includes mechanisms embodying the Habegger and Dombrowski invention, the entire disclosure of the Habegger and Dombrowski application is incorporated herein by reference.

The cord pullers 26, 27 are carried by mounting blocks 31, 32 which in turn are constrained to move toward and away from the stator core 17 by a rodlike member 33. It will be understood that the block mounting block assembly 31 is free to move vertically along the rod 33 when the apparatus 11 is provided with means for adjusting the height of the upper tying members. If the lower tying members were to be similarly adjusted, rod 33 would be extended, and lower block 32 would be movable therealong. The rod 33 is carried in a pusher block 34 which is mounted to a slide block 36 for movement therewith. The pusher block is connected to the end of the piston or ram 37 of a fluid cylinder 38 and is moved or actuated thereby. The fluid cylinder 38 may be, as desired, hydraulic or pneumatic, pneumatic cylinders being used throughout in FIG. 1.

The control circuitry associated with the apparatus 11 controls the valves which connect selected ones of the conduits or tubes 20, 30, 40, 50, etc., and high pressure fluid is supplied to cyliner 38 via conduit 20 so as to advance rod 37. The block 36 then is forced to slide along a pair of longitudinally extending parallel tracks 39, 41, along the machine frame 21 and formed by a pair of guide members mounted to the frame.

When the cord pullers 26 and 27 are advanced, pins 42 and 43 are in a position relative to slots 44, 46 as shown in FIG. 1; and a plunger carried in the hollow tubular portion of the cord pullers 26, 27 is in a retracted position. Then, after final cord segments have been laid into cord receiving regions 47, 48 of the cord pullers, a pair of cylinders 49, 51, are actuated by high pressure fluid applied through lines 30 and 40. When the cylinders 49 and 51 are actuated, the rods 52, 53 extend and move the heads 54, 56 of plunger rods 57, 58 in a direction to compress the springs 59, 61. Thus, the plungers move and clamp the final cord segments. Thereafter, while springs 59, 61, remain compressed, rod 37 retracts as high pressure fluid is supplied to line 60, and final segments of cord are pulled taut. As the pullers 26, 27 are retracted (the springs 59, 61 remaining compressed), the cutters or blades 62, 63 sever the final cord segment. Thereafter, the laced core 17 is removed from the apparatus 11, another core placed on the core support, and the above described sequence repeated. After stitching has begun, rods 52 and 53 retract for reasons that are more fully set out in the referenced Habegger and Dombrowski application.

Turning now to FIGS. 2 through 6, the above described sequence and apparatus operation will again be described. FIGS. 2 through 5 show the relationships between a pair of tying members such as cord tube 24 and lacing hook 64. A cord puller 26 has been shown in phantom in each of FIGS. 2–5, and it is to be emphasized that tube 24 and hook 64 could be in the relative positions thereof illustrated in either FIG. 2 or FIG. 3 without cord puller 26 having been advanced to a position overlying the lacing hook 64.

However, as cord tube 24 approaches the outer peripheral regions of the end turns 14 (for example, approximately the position thereof represented in FIG. 4), the cord puller 26 will be moved to a position overlying lacing hook 64 as represented in FIG. 4. Thus, as a final cord segment 66 is developed (refer to FIG. 5), a portion thereof is laid into the cord receiving region 47 of cord puller 26.

It can now be appreciated that as soon as the final cord segment 66 is developed, and preferably after the lacing hook and string tubes have reached their final dwell positions (again as represented in FIG. 5), the cord puller 26 is retracted to the position thereof shown in FIG. 1. This draws cord from the cord tube 24. In addition, the cord extending between the cord puller and the last stitch about the end turns 14 is severed. Thus, it is not necessary to wait until a final cord segment 66 has been developed, and then move a cord puller into proximity with such segment, grasp the segment and then return the puller.

It is to be understood that the apparatus 11 may be readily adjusted so that the cord puller 26 will advance to a position overlying the lacing hook 64 at any time after the final stitch about end turn portions 14 has been initiated. For example, with reference to FIG. 2, the cord puller 26 could be advanced as the lacing hook 64 is advancing between the portions of the end turns and the face 28 of core 17 as indicated by the arrow B in FIG. 2. Alternatively, the cord puller 26 may be advanced at any time after the time represented by FIG. 2 up until the time represented by FIG. 4 or very shortly thereafter. Thus, the timing of the advance stroke of cord puller 26 during the final stitch is not critical, and cord puller advance may occur at substantially any time after the final stitch has been started and until such time as the final cord segment 66 is finally developed. For ease of understanding, arrows in addition to arrow B have been provided adjacent to the cord issuing from cord tube 24 and also adjacent to the lacing hook 64 to indicate the relative direction of movement of such parts or development of a stitch in various ones of the FIGS. 2 through 5.

Figure 6:
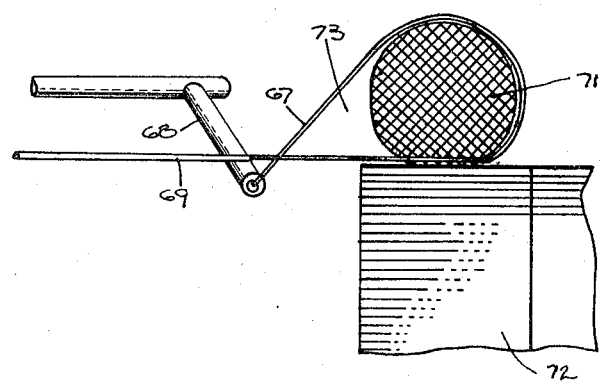

The above described sequential steps and the difference between such steps and teachings of prior art may be better understood by referring to FIG. 6.

In a prior approach (taught for example in the referenced Gawthrop et al patent) it was common practice to develop a final cord segment 67 with a lacing tube 68 and hook 69 so that stitching of an end turn 71 portion of a winding on a core 72 was completed prior to the time that a cord puller was advanced in close proximity to the final cord segment 67. Thereupon, a bar, hook, or recess in a cord puller would grasp and pull a final cord segment from the string tube as the cord puller returned to its rest position. It will be understood, however, that with prior approaches it was necessary to move the cord puller through an opening 73 formed by the final cord segment 67, the end turn 71, and the cord extending under from the hook 69. Moreover, since this opening in practice is quite small, the cord pullers heretofore (for consistent reliable operation) have been provided with relative pointed ends which could more readily be moved into opening 73.

By utilizing the approach taught herein, the use of a sharp or pointed cord puller may be avoided. Moreover, a minimum of time is required for pulling the final cord segment away from the last stitch on a winding and yet the timing of the advance and retraction of the cord puller is not critical.

In prior arrangements in order to keep to a minimum the increased cycle times associated with cord puller advance and retraction, it was necessary to advance a cord puller just as soon as possible after an opening 73 had been defined by the development of a final cord segment 67. Then, after the cord puller had been advanced and grasped the final cord segment 67, the cord puller would be retracted and the final cord segment severed.

Again, with the approach taught herein, the cord puller is in its advanced position during development and completion of the final stitch, and receives the final cord segment 66 as it is being developed. Thus, no time is required following completion of the last stitch, to advance the cord puller 26. On the contrary, as soon as the final cord segment 66 has been developed, the cord puller 26 can retract, sever the final cord segment, and a core may be removed from the apparatus 11.

Turning now to FIGS. 7–9, the sequence of steps discussed above in conjunction with FIGS. 2–5 will be again presented, in conjunction with FIGS. 7–9. With reference first to FIG. 9, it will be noted that the lower cord tube 74 and hook 76 of the apparatus 11 are revealed, although, for ease of description and illustration, cord tube 74 has been entirely omitted from FIGS. 7 and 8. However, all description herein pertaining to puller 26, hook 64, and tube 24 would also pertain to the sequential movements and relationships of puller 27, hook 76, and tube 74. As will be apparent from a review of FIG. 7–9, substantial portions of the stator core 17 and windings thereon have also been broken away and omitted, as have portions of the apparatus 11.

The relative position of plunger or rod 57 in the cylindrical portion 77 of puller 26 has been shown in its advanced position in FIG. 7 only for purposes of illustration because, in normal operation, the plunger 57 is retracted with pin 42 at the retracted end of slot 44 while the final stitch is being commenced. The plunger 57 has been shown as presented, so as to better illustrate the relationship between the clamping end 78 of plunger 57 and the cord receiving region 47 of the cord puller 26.

Turning now to FIG. 7, it will be appreciated that the core 17 periodically indexes in the direction of arrow A after the hook 64 has moved out from between the windings and stator face. With the core 17 shown in FIG. 7, insulation in the form of polyethelene terephthalate liners 71 extend along the faces of such slots. The hook 64 moves along the core face 78 between the projecting portions of adjacent ones of such insulating liners and, as the hook 64 has moved outwardly to approximately the relative position thereof shown in FIG. 7, the core is indexed in the direction of arrow A. Thereafter, the core 17 dwells while the hook 64 moves radially inwardly toward the center of the core 17. During this time, the cord tube 24 moves up and over the end turns 14 toward the bore of core 17 as indicated by arrow C. FIG. 7 has been selected to indicate the relative position of hook 64 and cord tube 24 just as a final stitch subcycle is being started.

When this condition occurs (as previously noted) the plunger 57 is retracted, and the clamping end 78 thereof is not present in the cord receiving region 47 of cord puller 26. Substantially any point in time after tube 24 has moved to the position thereof shown in FIG. 7, and up until such time that cord tube 24 has substantially completed the final stitch and is developing a final cord segment 66, the cord puller 26 may advance to overlie hook 64.

FIG. 8 illustrates the cord puller 26 in the advanced position thereof as the final cord segment 66 is being developed by cord tube 24. FIG. 9 represents the concluding development of the final cord segment 66 as it is placed into the cord receiving region 47 of cord puller 26. In both of FIGS. 8 and 9, the arrows D and E are used to denote the relative directions of movement of hook 64 and tube 24.

Turning now to FIG. 10, and with reference to the structure there schematically represented, one method of initiating the advance sequence of puller 26 will be described. It will be understood that, as illustrated, shaft 18 supports a proximity sensed flag and is the shaft used for indexing core 17. However, a main drive shaft or some other shaft or other member may carry a proximity sensed flag or other signal originating means (e.g., a mechanical limit switch) for initiating control signals used for purposes hereinafter described.

Carried on the lower portion of shaft 18, within the housing of apparatus 11 (or carried on another member interconnected for predetermined movement relative to shaft 18 as above suggested), is a flag 82 with a projection 83 thereon. As projection 83 passes proximity sensor or detector 84, a signal is supplied to leads 86, 87. This signal causes actuation of valving so that cylinder 38 (see FIG. 1) is supplied with high pressure fluid (see FIG. 1) and rod 37 is extended so as to advance puller 26 to the relative position thereof as indicated in FIG. 8. This would occur just as the stator 17 is indexed into position for a final stitch. Since the tying members are moving substantially continuously, initial movement of puller 26 thus occurs as the final stitch is being started, and by the time that tube 24 and hook 64 are in the relative positions thereof shown in FIG. 2, the cord puller 26 is in a "pick-up" or advanced position.

It is to be understood, however, that a signal may be derived from parts of apparatus 11 other than shaft 18 so that, by slightly adjusting the signal initiation point during movement of such parts, cord puller 26 may be advanced during any desired instant after the final stitch is started and before the final cord segment 66 has been fully developed.

Additional signal means, (e.g., sensors and flags) may also be used in conjunction with shaft 18 to provide a signal for causing actuation of plunger rod 57 so as to clamp the final cord segment 66 in the puller 26. Alternatively, such signal means may be associated with other parts. In an actual embodiment of the invention, we have used signal means associated with other machine parts (e.g., the drive mechanism for the tying members) to advance rod 57 so as to clamp the final cord segment, and to retract the cord puller. In this embodiment, as the tying members reach their final dwell position, a signal is initiated which causes substantially simultaneous actuation of valves that cause the cylinders 38, 49, and 51 (see FIG. 1) to respond so as to clamp the final cord segment and so as to retract puller 26.

During retraction of the cord pullers the cord is pulled tight against the cutting edge 88 of cutter 62 and the portion of the cord extending between the stator core 17 and (e.g., the retracted puller 26) is severed. However, the segment of cord extending from tube 24 to the puller 26 continues to be held by puller 26.

It will be understood that this cord is later released. Preferably, such release occurs after at least one or two stitches have been taken on a subsequent core. Details of this type of arrangement are more fully spelled out and described in detail in the aforementioned Habegger and Dombrowski application. Again, string or cord release may be initiated by a flag such as flag 82 on shaft 18.

While proximity and mechanical sensing members have been described for use in effecting control of the puller mechanisms mentioned herein, it should be understood that other specific means, including optic sensing members (for example, photo-electric devices) may be used to provide the signals which cause the proper timing and movement of the various movable members in the apparatus 11, and in particularly movement and operation of the cord pullers.

Also, while the proximity member 82 has been shown as being fixed on shaft 18, and sensor 84 is shown as being fixed to frame 21, either or both may be adjusted so that the exact point in time at which a signal appears on leads 86, 87 may be variably controlled. Similarly, other signal generating means used in the control system for apparatus 11 may be made so as to permit variable control of the time at which control signals are generated thereby.

It is to be noted that apparatus 11 may be used with cores that vary both in size and shape. Also, while core 17 has been illustrated at the tying station of apparatus 11 and depicted as being a core with flat sides in FIG. 1; the core has been depicted as a generally round core in FIGS. 7–9 for ease of illustration.

It will be appreciated from the foregoing that an effective and efficient arrangement is provided whereby the previously stated objects of the invention may be economically and reliably accomplished. More specifically, preferred forms of preferred methods and apparatus have been disclosed wherein quick, efficient cord pulling can be effected in a safe and reliable manner.

It also should be appreciated and understood that cord puller mechanisms other than the type shown herein (and claimed in the Habegger and Dombrowski application) may be used while practicing our invention. For example, a simple barbed type of puller may be used, in which event a final cord segment may be laid behind a barb (or hook) on the puller. Even with a structure such as this, however, the leading end may still be made to be relatively blunt, rather than pointed.

Accordingly, it should now be apparent to persons skilled in the art that, while we have shown and described what at present are considered to be the preferred embodiments of our invention in accordance with the Patent Statutes, changes may be made in the structures and sequential steps disclosed herein without actually departing from the true spirit and scope of our invention. Accordingly, we intend to cover in the following claims all such equivalent variations as fall within the invention.

What we claim as new and desire to secure by Latters Patent of the United States is:

1. Apparatus for tying cord about at least one end turn portion of at least one coil projecting beyond at least one side surface of a magnetic core carrying side turn portions of the at least one coil, the apparatus comprising: at least one tying member for tying cord about the at least one coil and for developing a final cord segment; means for periodically effecting relative movement between a core and the at least one tying member; means for pulling at least a portion of a final cord segment from the at least one tying member, said means for pulling including a cord puller having a cord receiving region; and actuating means for causing the cord puller to advance the cord receiving region thereof to a predetermined region relative to the core before the at least one tying member fully develops the final cord segment.

2. The apparatus of claim 1 wherein the actuating means includes a signal device for establishing a signal before the final cord segment is fully developed; and wherein the apparatus includes cord puller advancing means; said cord puller advancing means being responsive to signals from the signal device.

3. Apparatus for tying cord about at least one end turn portion of at least one coil projecting beyond at least one side surface of a magnetic core carrying at least one side turn portion of the at least one coil, the apparatus comprising: at least two tying members for moving cord about at least one end turn portion of a coil; means for periodically effecting relative movement between a core and the at least two tying members; at least one of the tying members being movable to develop a final cord segment adjacent to a coil; means for pulling at least a portion of a final cord segment away from a coil; means for providing a signal at a predetermined time at least before a final cord segment is fully developed; and an actuating device for moving said means for pulling, in response to the signal, from a first predetermined location remote from said at least one of the tying members to a second predetermined location more proximate to said at least one of the tying members before said at least one of the tying member completely develops the final cord segment.

4. Apparatus for tying cord about at least one end turn portion of at least one coil carried by a magnetic core, the apparatus comprising: tying members for tying cord about at least one coil on a core; means for periodically causing relative movement between a core and the tying members; means for receiving a portion of a final cord segment before a final stitch about the at least one coil has been completed, and for moving the received portion of the final cord segment to a first location spaced from the tying members, said means for receiving and moving including a cord puller having a cord receiving region; means for generating a signal at a predetermined time before a final stitch is completed; and means for moving the cord puller to a final cord segment receiving position in response to the signal.

5. The apparatus of claim 4 wherein the means for receiving includes a cord puller tube and wherein cord severing means are supported on said cord puller tube.

6. The apparatus of claim 4 wherein at least one fluid pressure responsive device is provided for effecting movement of the cord puller tube.

7. A method of tying cord about at least one end turn portion of at least one winding supported on a magnetic core, grasping a portion of a final cord segment and moving at least part of the final cord segment to a predetermined location, said method comprising: placing a magnetic core having at least one winding thereon at a tying station; placing cord loops about at least one end turn portion of a winding on the magnetic core; moving a final cord segment receiving device into proximity with the magnetic core at least before a final cord segment is completely developed; forming a final cord segment extending from the at least one winding and positioning a portion of the final cord segment adjacent to the final cord segment receiving device; and thereafter moving at least a portion of the final cord segment to the predetermined location.

8. The method of claim 7 further including severing a portion of the final cord segment.

9. The method of claim 7 wherein the final cord segment receiving device comprises a cord pulling assembly having a cord receiving region of the first assembly; and further including grasping the final cord segment by clamping a portion of the final cord segment in the cord pulling assembly.

10. A method of pulling a final cord segment developed by at least one member for tying cord about at least one end turn portion of at least one winding supported on a magnetic core; said method comprising relatively moving the at least one member and the at least one end turn portion of the at least one winding so as to wrap cord about the at least one end turn portion, moving a cord pulling member from a first predetermined position remote from the at least one end turn portion of the at least one winding to a second predetermined position less remote from the at least one end turn portion of the at least one winding; and thereafter positioning at least a portion of the final cord segment along a cord receiving region of the cord pulling member, completing the full development of the final cord segment, and moving the cord pulling member away from the second predetermined position.

11. A method of tying cord about end turn portions of at least one coil projecting beyond at least one side surface of a magnetic core carrying at least one side turn portion of at least one coil, the method comprising: tying cord about the at least one coil while using at least one tying member; periodically effecting relative movement between a core and the at least one tying member while tying cord about the at least one coil; causing a cord puller to advance a cord receiving region thereof to a predetermined location relative to the core before completing development of a final cord segment with the at least one tying member; moving a portion of a final cord segment into proximity with the cord receiving portion of the cord puller and completing development of a final cord segment; and causing the cord puller to move to a position spaced from the predetermined location and thereby moving at least part of the final cord segment toward such position.

* * * * *

UNITED STATES PATENT OFFICE
CERTIFICATE OF CORRECTION

PATENT NO. : 3,862,493
DATED : January 28, 1975
INVENTOR(S) : Richard J. Habegger and Stanley L. Warfel It is certified that error appears in the above-identified patent and that said Letters Patent are hereby corrected as shown below:

```
Change inventor's name "Wargel" to --Warfel--
Column 1, line 30, after "Gawthrop" delete ","
Column 2, line 39, after "e.g." insert --,--
Column 2, line 39, change "faces," to --"faces",--
Column 2, line 41, delete "therein" and insert --thereon--
Column 3, line 51, after "Gawthrop" delete ","
Column 3, line 65, after "333,495" insert --(Patent 3,813,754)--;
                   same line, after "336,727" delete "(Pat. No.
                   3,813,754)"
Column 4, line 19, after "throp" delete ","; same line, after
                   "et al." delete ","
Column 4, line 21, change "the" to --and--
Column 4, line 40, change "core" to --cord--
Column 4, line 46, change "1" to --11--
Column 9, line 40, change "Latters" to --Letters--
Column 10, line 16, change "member" to --members--
```

Signed and sealed this 24th day of June 1975.

(SEAL)
Attest:

RUTH C. MASON
Attesting Officer

C. MARSHALL DANN
Commissioner of Patents
and Trademarks